(12) United States Patent
Pressmar

(10) Patent No.: US 6,920,457 B2
(45) Date of Patent: Jul. 19, 2005

(54) VIRTUAL DATABASE OF HETEROGENEOUS DATA STRUCTURES

(76) Inventor: Peter Pressmar, Rosenstrasse 9, 71034 Böblingen (DE)

( * ) Notice: Subject to any disclaimer, the term of this patent is extended or adjusted under 35 U.S.C. 154(b) by 402 days.

(21) Appl. No.: 10/146,850

(22) Filed: May 16, 2002

(65) Prior Publication Data

US 2003/0004960 A1 Jan. 2, 2003

(51) Int. Cl.⁷ .............................. G06F 17/30
(52) U.S. Cl. ............... 707/101; 707/101; 707/102; 707/104.1; 707/100
(58) Field of Search ............... 707/101, 102, 707/104.1, 100

(56) References Cited

U.S. PATENT DOCUMENTS

| | | | |
|---|---|---|---|
| 5,550,971 A | 8/1996 | Brunner et al. | 707/3 |
| 6,671,689 B2 * | 12/2003 | Papierniak | 707/100 |
| 2003/0004960 A1 * | 1/2003 | Pressmar | 707/100 |

FOREIGN PATENT DOCUMENTS

WO    WO 96/30845    10/1996

OTHER PUBLICATIONS

Davis, J. P., et al., "EDICT—An Enhanced Relational Data Dictionary: Architecture and Example", Data Engineering, 1988, Proceedings, Fourth International Conference on Los Angeles, CA, USA Feb. 1–5, 1988, pp. 184–191.

* cited by examiner

Primary Examiner—Charles Rones
(74) Attorney, Agent, or Firm—Scully, Scott, Murphy & Presser

(57) ABSTRACT

The described database (100) for receiving information, the described method and information management program (90), and the described apparatus for receiving and administering information in the form of arbitrarily structured data sets in at least one storage device of one or more data processing devices, has hierarchy levels, whereby a superior hierarchy level (119) contains information elements (111, 112, 113) for the definition of a structure of information elements (130, 140, 150) of a subordinate hierarchy level (129), and a subordinate hierarchy level (129) contains information elements (130, 140, 150) in an instantiation (131–136, 141–146, 151–156) in accordance with the structure which is defined at least by one information element (111, 112, 113) of the superior hierarchy level (119). As a result one obtains a database (100) having self-defining information.

34 Claims, 11 Drawing Sheets

Figure 1:
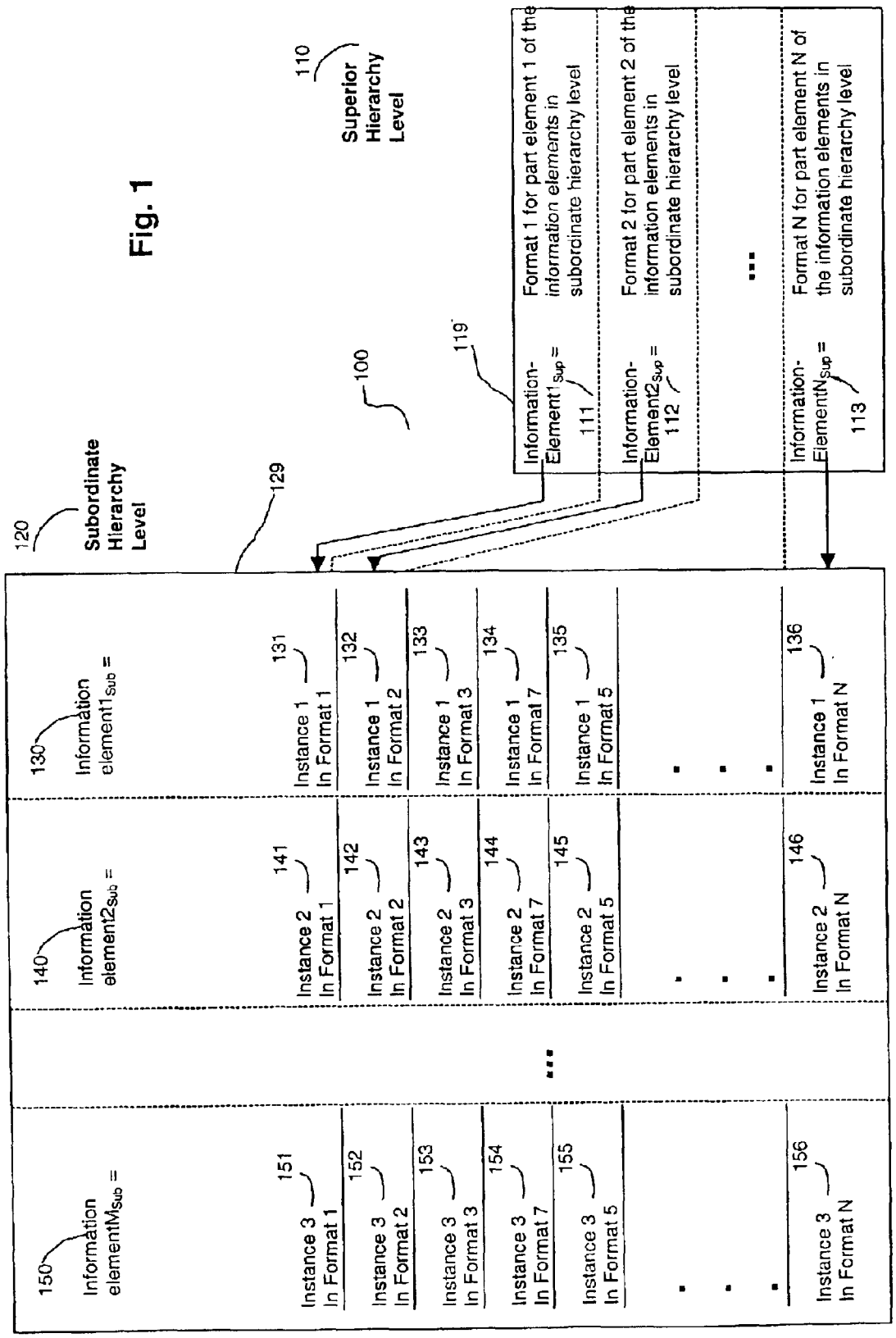

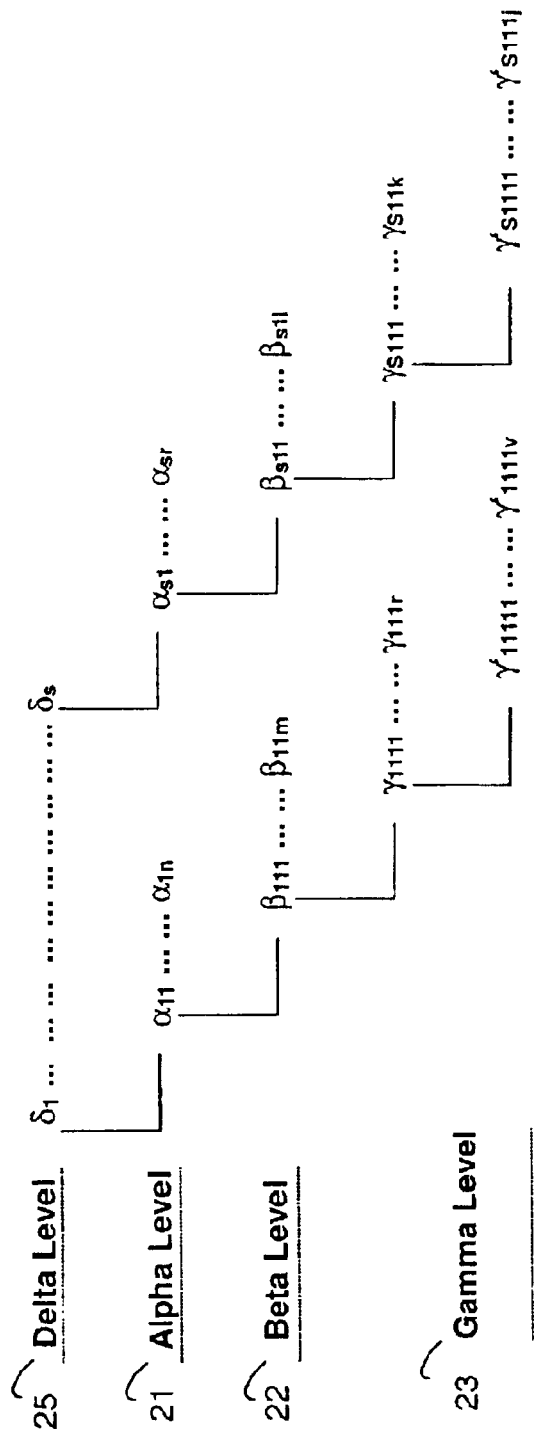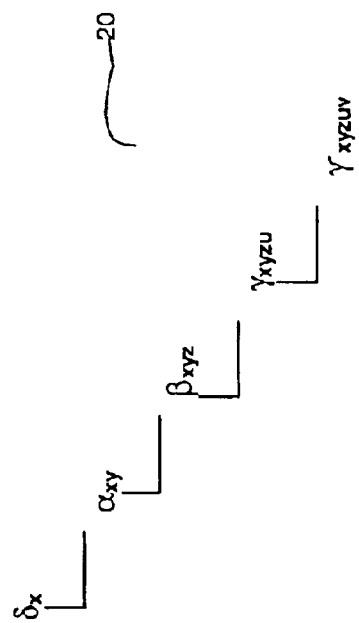
Fig. 2

| Delta | Alpha | Beta | Gamma | RNR | DATEFROM | DATETO | Information |
|---|---|---|---|---|---|---|---|
| 001 | | | | 001 | 1.1.2001 | 31.12.9999 | Administration |
| 001 | 010 | | | 010 | 1.1.2001 | 31.12.9999 | Clipboard| |
| 001 | 010 | | | 011 | 1.1.2001 | 31.12.9999 | Field Short Designation|25|C|D| |
| 001 | 010 | | | 012 | 1.1.2001 | 31.12.9999 | Length|8|9|D| |
| 001 | 010 | | | 013 | 1.1.2001 | 31.12.9999 | Field Character|1|C|D| |
| 001 | 010 | | | 014 | 1.1.2001 | 31.12.9999 | Status|1|S| |
| 001 | 010 | | | 015 | 1.1.2001 | 31.12.9999 | Status sequence|2|9| |
| 001 | 010 | | | 016 | 1.1.2001 | 31.12.9999 | Reference|1|L| |
| 001 | 010 | | | 017 | 1.1.2001 | 31.12.9999 | Status separator|1|C| |
| 001 | 010 | 020 | | 020 | 1.1.2001 | 31.12.9999 | Folder| |
| 001 | 010 | 020 | | 021 | 1.1.2001 | 31.12.9999 | Folder No|5|C|S|1| |
| 001 | 010 | 020 | | 022 | 1.1.2001 | 31.12.9999 | Sub-Folder No|4|9|S|2| |
| 001 | 010 | 020 | | 023 | 1.1.2001 | 31.12.9999 | Journals|10|C|S|3|Title| |
| 001 | 010 | 020 | | 024 | 1.1.2001 | 31.12.9999 | Keyword-1|15|C|D|1|Article| |
| 001 | 010 | 020 | | 025 | 1.1.2001 | 31.12.9999 | Documents|2|B|D|2| |
| 001 | 010 | 020 | 032 | 032 | 1.1.2001 | 4.1.2001 | 21|1 02|Capital|~|Shares|Shares.doc |
| 001 | 010 | 020 | 032 | 044 | 5.1.2001 | 31.12.9999 | 21|1 02|Capital|~|Shares|Shares2.doc |
| 001 | 010 | 020 | 033 | 033 | 1.1.2001 | 31.12.9999 | 22|1 02|DM|~|Real Estate 2001|| |

| | |
|---|---|
| 25 | DELTA LEVEL |
| 21 | ALPHA LEVEL |
| 22 | BETA LEVEL |
| 23 | GAMMA LEVEL |

Fig. 3

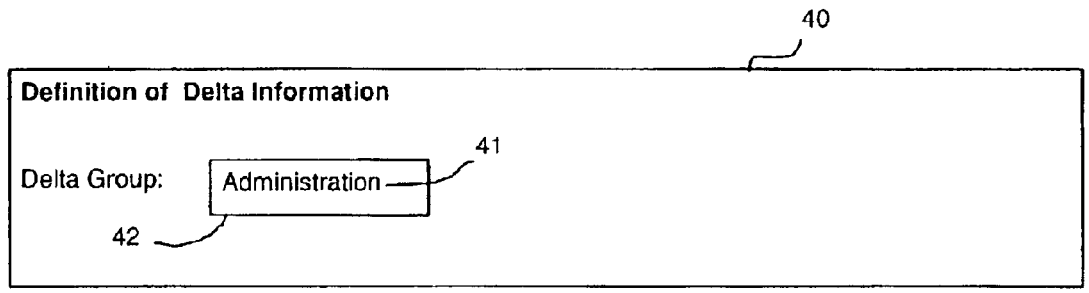
Fig. 4
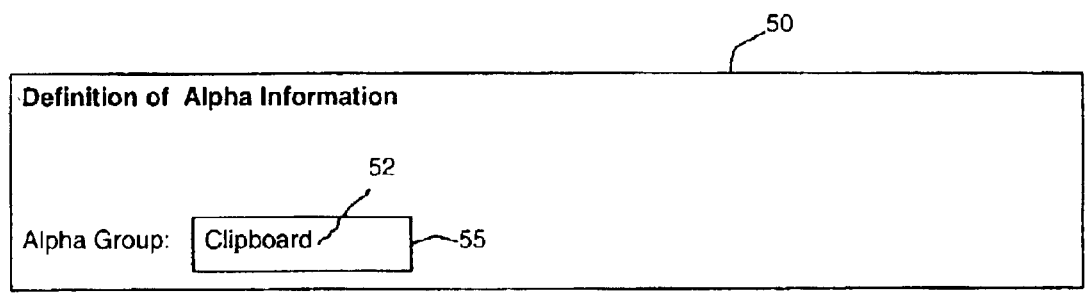
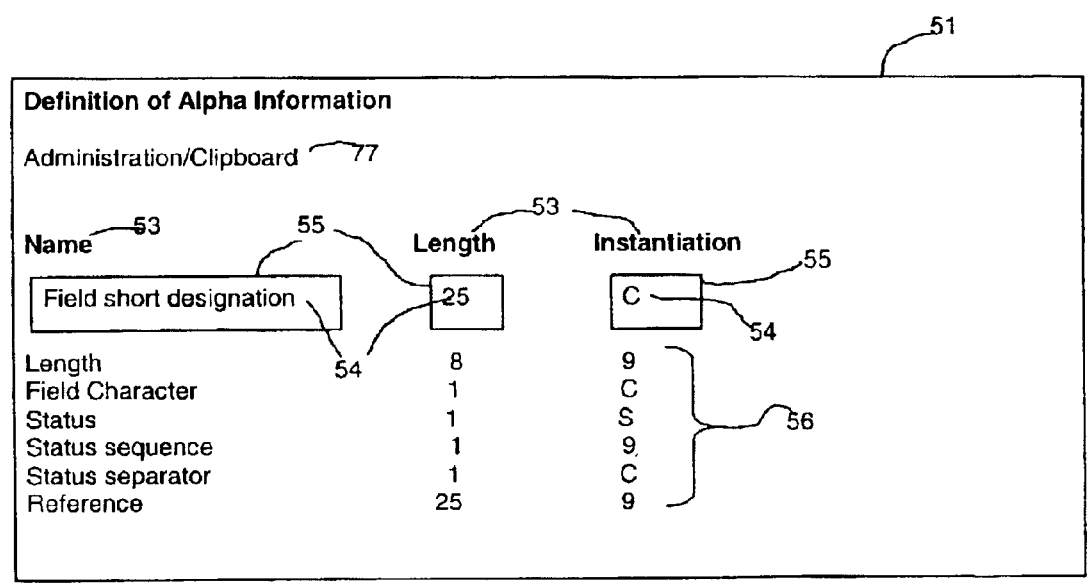
Fig. 5

Fig. 10

| Delta | Alpha | Beta | Gamma | RNR | DATEFROM | DATETO | Information |
|---|---|---|---|---|---|---|---|
| 002 | 10 | | | 002 | 1.1.2001 | 31.12.9999 | IT |
| 002 | 10 | | | 101 | 1.1.2001 | 31.12.9999 | Structures| |
| 002 | 10 | | | 111 | 1.1.2001 | 31.12.9999 | Field Short Designation|25|C|D| |
| 002 | 10 | | | 112 | 1.1.2001 | 31.12.9999 | Length|8|9|D| |
| 002 | 10 | | | 113 | 1.1.2001 | 31.12.9999 | Field Character|1|C|D| |
| 002 | 10 | | | 114 | 1.1.2001 | 31.12.9999 | Status|1|S| |
| 002 | 10 | | | 115 | 1.1.2001 | 31.12.9999 | Status sequence|1|9| |
| 002 | 10 | | | 116 | 1.1.2001 | 31.12.9999 | Reference|1|L| |
| 002 | 10 | 120 | | 120 | 1.1.2001 | 31.12.9999 | ITSTR01| |
| 002 | 10 | 120 | | 121 | 1.1.2001 | 31.12.9999 | Key001|5|9|S|1|Elements |
| 002 | 10 | 120 | | 122 | 1.1.2001 | 31.12.9999 | Key002|4|9|S|2|Elements| |
| 002 | 10 | 120 | | 123 | 1.1.2001 | 31.12.9999 | Field001|3|C|D|1|Elements| |
| 002 | 10 | 120 | | 124 | 1.1.2001 | 31.12.9999 | Field002|4|C|D|2| |

Fig. 11

| Delta | Alpha | Beta | Gamma | RNR | DATEFROM | DATETO | Information |
|---|---|---|---|---|---|---|---|
| 100 | 1010 | | | 1001 | 1.1.2001 | 31.12.9999 | IT |
| 100 | 1010 | | | 1010 | 1.1.2001 | 31.12.9999 | Rules| |
| 100 | 1010 | | | 1011 | 1.1.2001 | 31.12.9999 | Field Short Designation|25|C|D| |
| 100 | 1010 | | | 1012 | 1.1.2001 | 31.12.9999 | Length|8|9|D| |
| 100 | 1010 | | | 1013 | 1.1.2001 | 31.12.9999 | Field Character|1|C|D| |
| 100 | 1010 | | | 1014 | 1.1.2001 | 31.12.9999 | Status|1|S| |
| 100 | 1010 | | | 1015 | 1.1.2001 | 31.12.9999 | Status sequence|2|9| |
| 100 | 1010 | 1020 | | 1020 | 1.1.2001 | 31.12.9999 | Dateline Reason| |
| 100 | 1010 | 1020 | | 1021 | 1.1.2001 | 31.12.9999 | Inc. Kind|2|9|S|1| |
| 100 | 1010 | 1020 | | 1022 | 1.1.2001 | 31.12.9999 | Procedure. Kind|4|9|S|2| |
| 100 | 1010 | 1020 | | 1023 | 1.1.2001 | 31.12.9999 | DateIn Reason|3|9|D|1| |
| 100 | 1010 | 1020 | | 1024 | 1.1.2001 | 31.12.9999 | Action Kind|2|9|D|2| |
| 100 | 1010 | 1020 | | 1025 | 1.1.2001 | 31.12.9999 | Desig.|1|0|C|D|3| |
| 100 | 1010 | 1020 | 1032 | 1032 | 1.1.2001 | 4.1.2001 | 21|01|02|037|90|Reminder| |
| 100 | 1010 | 1020 | 1032 | 1044 | 5.1.2001 | 31.12.9999 | 21|01|02|037|91|Further Reminder| |
| 100 | 1010 | 1020 | 1033 | 1033 | 1.1.2001 | 31.12.9999 | 22|01|02|037|90|Reminder| |

VIRTUAL DATABASE OF HETEROGENEOUS DATA STRUCTURES

The present invention relates to a database for the production and administration of heterogeneous data structures. The invention further concerns a method, a computer program and an apparatus for the set-up and for the administration of this database, and for the exchange of data between non-compatible systems.

The requirements of information technology and communications technology are subject at the present time to continuous change. Adaptation to these changed requirements is not always satisfactorily provided by today's programs and systems. The investment of many undertakings, effected over many years, in their data processing systems has built up extensive quantities of data in old applications which as a rule are no longer available to the newer, more innovative applications since the data is often closely linked with the particular features of the application on which is it based.

In order to take account of the constantly increasing demands, the applications must be flexibly constituted. Thereby, information subject to change is stored outside the programs, in order to obtain applications which to some extent are stable and capable of adaptation. This kind of data management applies in particular also for transformations at interfaces. The programmers aid's for constructing an appropriate data management system are thereby restricted to tabular structures and many kinds of database.

Tabular structures are easy to alter and open, and thus can also be altered readily by a lay person. Against these advantages there stands the disadvantage that tabular structures have fixed field structures. That makes them inflexible, and since new structures thus cannot be integrated, tabular structures are also not capable of expansion. Many applications, however, need different data structures. For each requirement of a different kind, a new table must be constructed. Since the data structures in tabular structures cannot be read and altered by means of applications, this means an enormous effort which is linked with high costs.

SQL databases have a higher capability for expansion with many possible data structures in one system. A database management system ensures also a high security of the implemented data structures. In contrast to tabular structures, SQL databases are not open, i.e. they can only be changed by specialists. A change or a new input of structures is associated with a great effort. One inflexibility of SQL databases consists in that their data structures cannot be read or altered by means of applications.

Object databases share, with regard to the access to structures, the disadvantages of SQL databases and just like these can only be altered by specialists. They also have a high capability for expansion and are also more flexible.

Meta-databases require no fixed structures and therefore different fields are possible. Of disadvantage is the restriction on field instantiations. Meta-databases are difficult to master. As a rule they form the basis for other kinds of database. Also with meta-databases, the data structures cannot be read and altered by means of applications.

A data management as a basis for a flexible configuration of applications, that is of programs and systems, must be open as is the case with tables and also extremely flexible. This means that it has no fixed fields and structures and moreover recognizes no restrictions on field and structure instantiations. A further condition of flexibility is that the data structures can be read and altered by means of applications. The aids mentioned above meet these criteria only unsatisfactorily.

It is thus an object of the present invention to provide a data management which fulfills the above criteria and thus allows a set-up of programs and systems which adapt to changed requirements with little effort or automatically.

This object is achieved by means of a database for receiving information in the form of arbitrarily structured data sets in at least one storage device of one or more data processing devices having hierarchy levels, whereby a superior hierarchy level contains information elements for a definition of the structure of information elements of a subordinate hierarchy level, and a subordinate hierarchy level contains information elements in a instantiation in accordance with a structure which is defined by at least one information element of the superior hierarchy level, a first hierarchy level contains information elements for the definition of the structure of information elements of a second hierarchy level, a second hierarchy level contains information elements for the definition of the structure of information elements of a third hierarchy element, a third hierarchy element contains information elements for receiving information, and a link structure connects the information on the various hierarchy levels, whereby the link structure contains in a first internal data field a first attribute for the unique association of an information element with an information element or with a set of information elements of the first hierarchy level, in a second internal data field a second attribute for the unique association of an information element with an information element or with a set of information elements of the second hierarchy-level, in a third internal data field a third attribute for the unique association of an information element with a set of information elements of the third hierarchy level, and the allocation of an information element to a hierarchy level is determined from the existence of and/or the values of the attributes in the first, second and third internal data fields of the link structure.

Further, the object of the present invention is achieved by means of a method for setting-up and for administering a database according to the invention, having steps for establishing the hierarchy levels, for establishing information elements within these hierarchy levels and for the production of links between information elements on differing hierarchy levels.

The object is further achieved by means of an information management program for being executed on one or more data processing devices with means for carrying out a method in accordance with the invention.

Beyond this, the object of the present invention is achieved by means of an apparatus for receiving and administering information in the form of arbitrarily structured data sets, which has at least one data processing facility, at least one storage device for receiving the data sets, and a device for executing a database management program in accordance with the invention.

The proposed system of data management in a plurality of hierarchy levels allows in diverse manners the storing of data sets which are structured most differently in one database and thus fulfills the requirements placed on information and communications technology for the greatest possible flexibility of data management through the avoidance of restrictions with regard to field and structure instantiations of the stored information. In particular requirements for easier alterability of the structures and for the greatest possible openness of the system are fulfilled since it is very simple, in particular for lay persons, to define new structures. The expandability of the database is promoted by the ready integrability of new data structures and a readily understandable and secure database management.

Advantageous developments of the solution in accordance with the invention are possible through the measures set out in the sub claims.

In a preferred embodiment of the present invention, the definitions for the structuring of information elements of the first hierarchy level of the database are effected in a basic foundation. With this, a user has the possibility to configure the basic structure of the database in accordance with his requirements.

Furthermore, a definition of an ordering level advantageously allows the grouping of elements of the first hierarchy level and/or elements of the second hierarchy level. Hereby, a fourth internal data field suitably contains a fourth attribute for the unique association of an information element with an information element or a set of information elements of the ordering level. An allocation of an information element to the ordering level is preferably determined from the existence of and/or the value of the attribute in the fourth internal data field of the link structure to allow an easy association of a data set with an instance of the ordering level by reducing it to a determination of particular values or an omission of values in the fourth internal data field of the link structure.

The build-up of the link structure can be carried out in particular through the combination of the values of the first, second and third attributes and in the case of the existence of an ordering level additionally through the value of the fourth attribute. Advantageously there is associated with each information element in a fifth internal data field of the link structure a fifth attribute for a unique identification, whereby preferably a sixth internal data field of the link structure is provided for receiving information elements of the hierarchy levels. With this, there can be defined in a simple matter structures for finding the field definitions associated with an information element, and a unique identification of a data set is provided.

In a preferred embodiment of the present invention there is associated with each information element a time value for determining its temporal referencing. In particular, the temporal referencing is built up of an initial value and a final value, whereby further the initial value and the final value of the temporal referencing can be received in internal data fields of the link structure. This permits the historical categorization of data so that the same items of information having different temporal referencing possess different validities overlapping of data is thus excluded and moreover a user obtains the possibility by means of the temporal referencing to read out correct information.

Preferably an alteration of an information element is effected at least via a generation of a new information element as a copy of the information element to be altered, followed by an alteration of the new information element, and the allocation of a new temporal reference to the new information element, so that the greatest possible consistency of the data management system is ensured.

The definitions determined in an information element or in a set of information elements in the first hierarchy level advantageously form the template for the instantiation of an information element of the second hierarchy level having identical value of the attribute in the first internal data field of the link structure, and the definitions determined in an information element or a set of information elements of the second hierarchy level advantageously form the template for the instantiation of an information element of the third hierarchy level having identical value of the attribute in the second internal data field of the link structure. With this there is achieved a simple and direct association of the field definitions with their forms of instantiation.

In accordance with an advantageous development of the present invention, each set of information elements has an anchor information element (39) which is distinguished in that the attribute value in the internal data field of the link structure designating its association with a hierarchy level is identical with the attribute value in the fifth internal data field of the link structure associated therewith. With this the unique identification of the anchor information element, as takes place through the attribute value in the fifth internal data field, is carried over for unique identification of a set of information elements. The anchor information element thus delivers, within the link structure, the basis address for locating a set of information elements which belong together.

Further, each set of information elements which does not belong to the third hierarchy level may have at least one information element with a content descriptive of this set of information elements. This advantageously allows the employment of descriptions for the characterization of a set of information elements. Thereby, there is attained on the one hand an ordering of the information structure of the database in accordance with understandable criteria and on the other hand through these descriptive criteria there are opened up favorable possibilities for searching for a desired information element set.

Preferably, such an information element having a descriptive content is the anchor information element. The anchor information element is thus in itself not a definition parameter but forms the basis for the inheritance of the definitions which are determined in the associated information element set.

A logical coupling of a plurality of individual databases to one database advantageously opens up the possibility of a platform independent virtual database as a pool of information and structure information and, vice versa, also the physical division of the database itself.

Advantageously an interpretation of data sets from a delivering system external to the database is effected on the basis of data structure information concerning the delivering system, which information is placed in the database in the form of one or more information elements, and further a structuring of data sets for output to a target system external to the database can also be effected on the basis of data structure information concerning the target system, which is placed in the database in the form of one or more information elements. Preferably here a transfer of data sets from a first structure into a second structure is effected in accordance with rules of allocation which are placed in the database in the form of one or more information elements. The structuring of data sets of external databases and also of a database in accordance with the invention can thus be simply effected on the basis of the data structure information placed in the database in accordance with the invention.

Preferably, the communication of application programs with the database takes place in the form of requests to the database, whereby a request may further manifest at least indications concerning the kind or nature of the request. This makes it possible for user programs to use data of other systems without knowledge of their structures and field attributes. The interpretation and, if applicable, the translation of the data is carried out by the method in accordance with the invention.

In a preferred embodiment of the present invention the control of requests from application programs to the database is effected by means of a central control device, which advantageously further undertakes a check of the integrity of data from a request on the basis of rules which are placed in the databank of the database in the form of one or more information elements. Advantageously a request to the database has a processing dateline and the central control device brings about the execution of the request by the processing dateline. Thus, as a central system, the central control device undertakes the information exchange between delivering and target systems and takes care of the timely making available of data to the target system.

Advantageously, the central control device carries out partial requests of at least two application programs, the partial requests together forming a common request to the database, independently of one another in accordance with the needs of each individual partial request. This decouples the making available of delivering and target system information and thus ensures that the running times of the two systems can be independent of one another.

An advantageous return report concerning the state of processing of an issued request is attained in that the central control device informs an application program concerning the state of processing of a request. For improved coordination of information data between different systems the central control device generates additional data on the basis of information of the database. An advantageous documentation of the procedures is attained in that at least a part procedure of the processing of a request is recorded by the central control device.

The database administered by the information management program is, in a preferred exemplary embodiment of the present invention, held on a different data processing device than the information management program itself, so that arbitrary hardware structures can be used.

Advantageously at least one data processing facility of the apparatus for receiving and administering information in the form of arbitrarily structured data sets exchanges data via a network connection. Advantageously at least one data processing facility of the device is accessible via a public network. Therewith, network systems and for example also the Internet can be used for a wide access to the database in accordance with the invention.

The database in accordance with the invention and the information management program in accordance with the invention make possible innovative connections between different application systems, whereby the flexibility in the data management system is further extended by a dynamic management of information through the possibility of allowing data structures not only to be read but also to be altered by application programs. Thus, the database system in accordance with the invention can be exploited as a general interface between communicating application programs or application systems, so that these systems need not have their own interface definitions for data exchange with the most diverse other application programs or application systems. Only one interface for the read-in and read-out of data must be present. The memory of the interface need not for this purpose recognize any definitions of the data structure, rather the information management program can merely set up regions therein which can hold structures and substructures which are delivered externally. An interpretation of this information is then effected e.g. from the structures placed in the database in accordance with the invention, as will be explained in more detail below. In principle, for this purpose an interpretation module applies a template to each structure or part structure and transforms the data into other structures or part structures. The transformed data is then made available by the information management system to the target systems, taking into account for example datelines, histories, rules, or the like. Thereby there can be realized without great effort B2B applications (Business-to-Business, intranet or Internet applications), transport and logistic systems and naturally also a transformation service. By means of the selective call up of information management program or the central control device both peer-to-peer communication and also client-server-client communication are made possible. In the case of client-server-client communication, an application program sends as client a request to the central control device functioning as the server. This carries out the request with the aid of the information management program and makes the result available to other application programs (clients). In the case of peer-to-peer communication, a user program passes the request directly to the information management program; this carries out the request and passes the result to the request issuer. The user program then itself passes the result to another user program. In a mixed form of the two kinds of communication a user program gives the request directly to the information management program; this carries out the request and makes the result available to other user programs.

Figure 6:
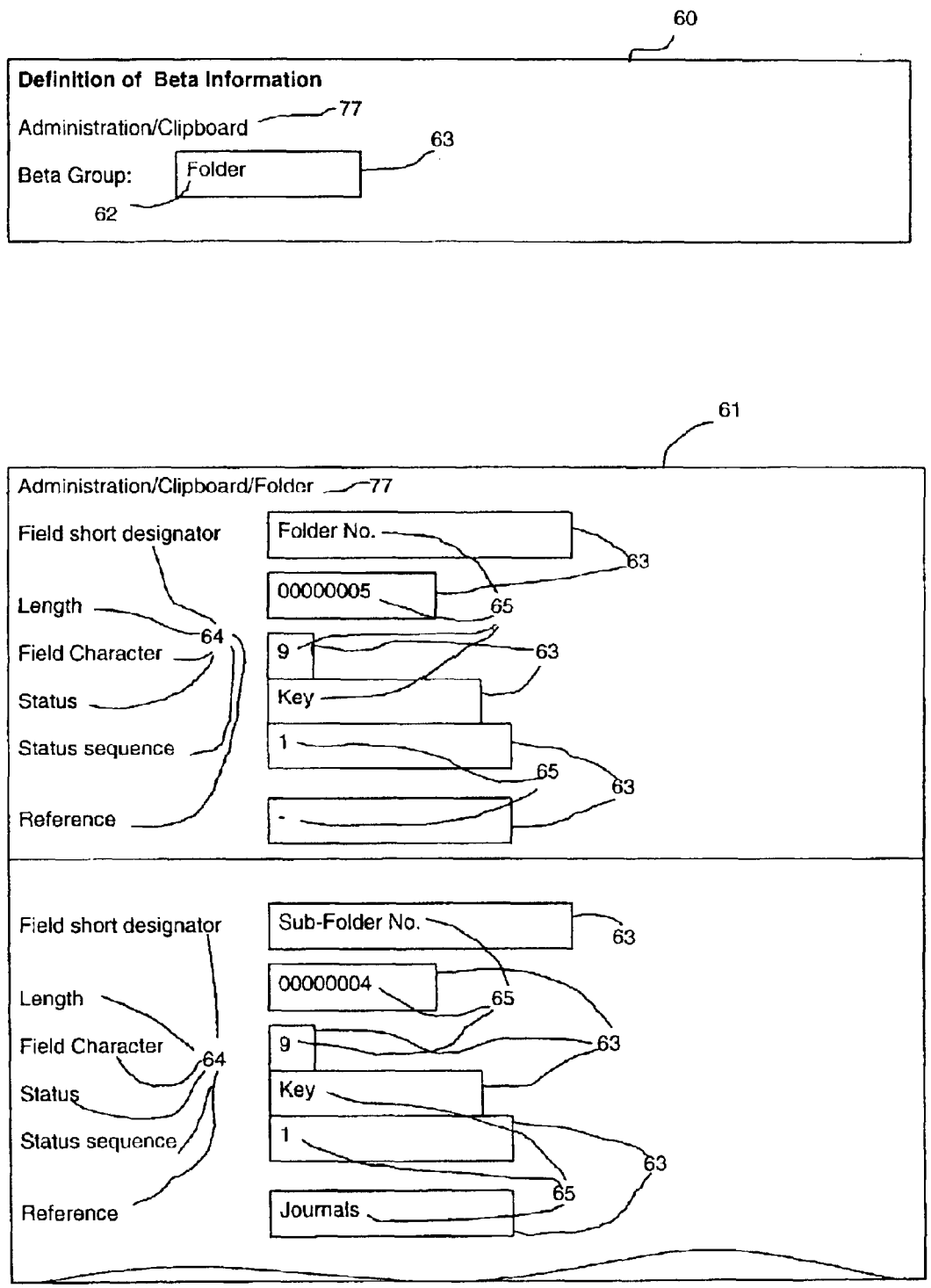
Figure 7:
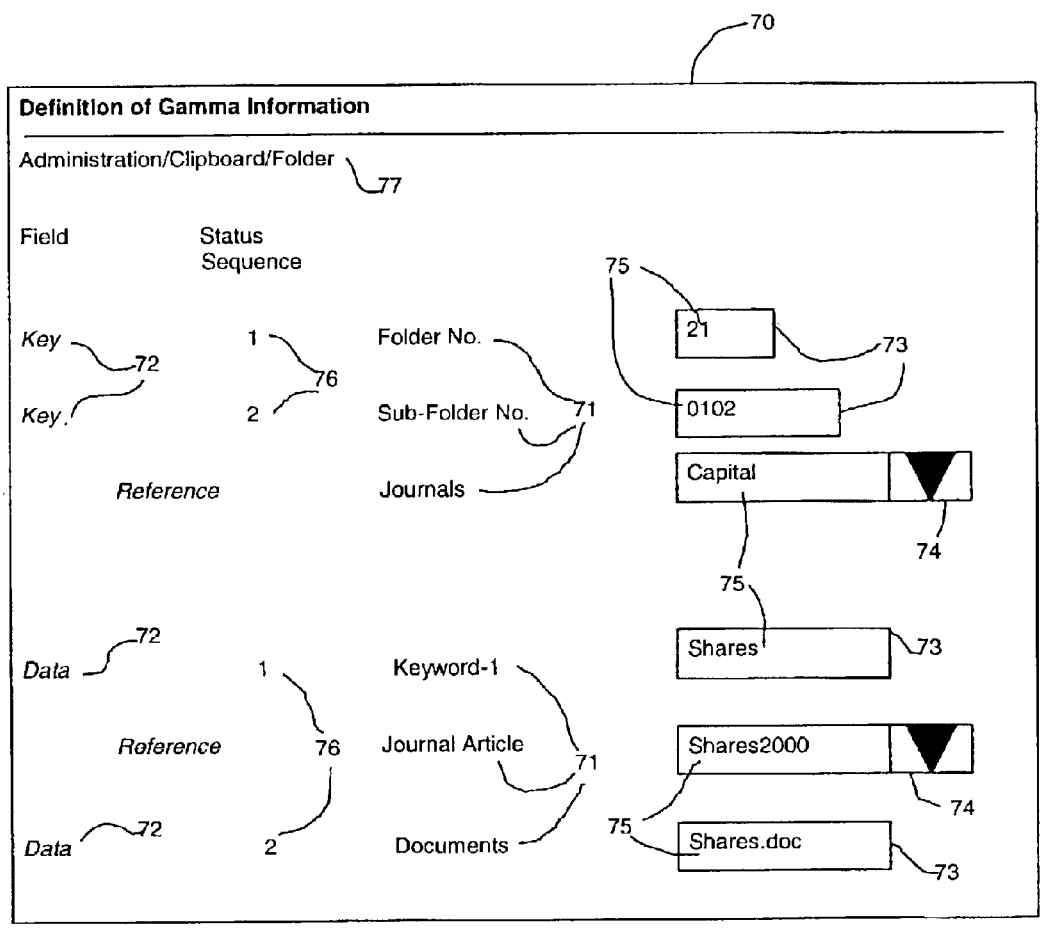
Figure 8:
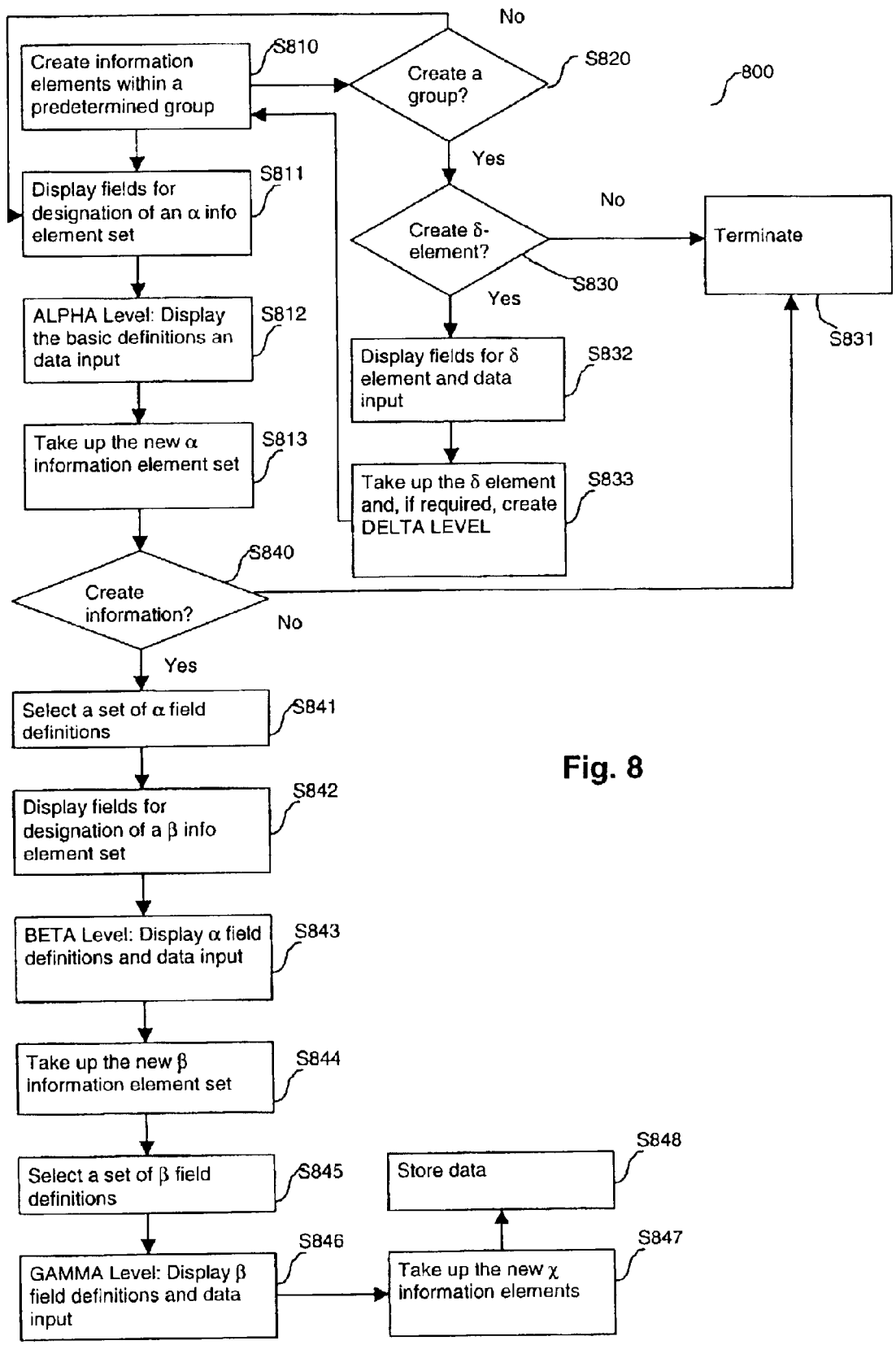
Figure 9:
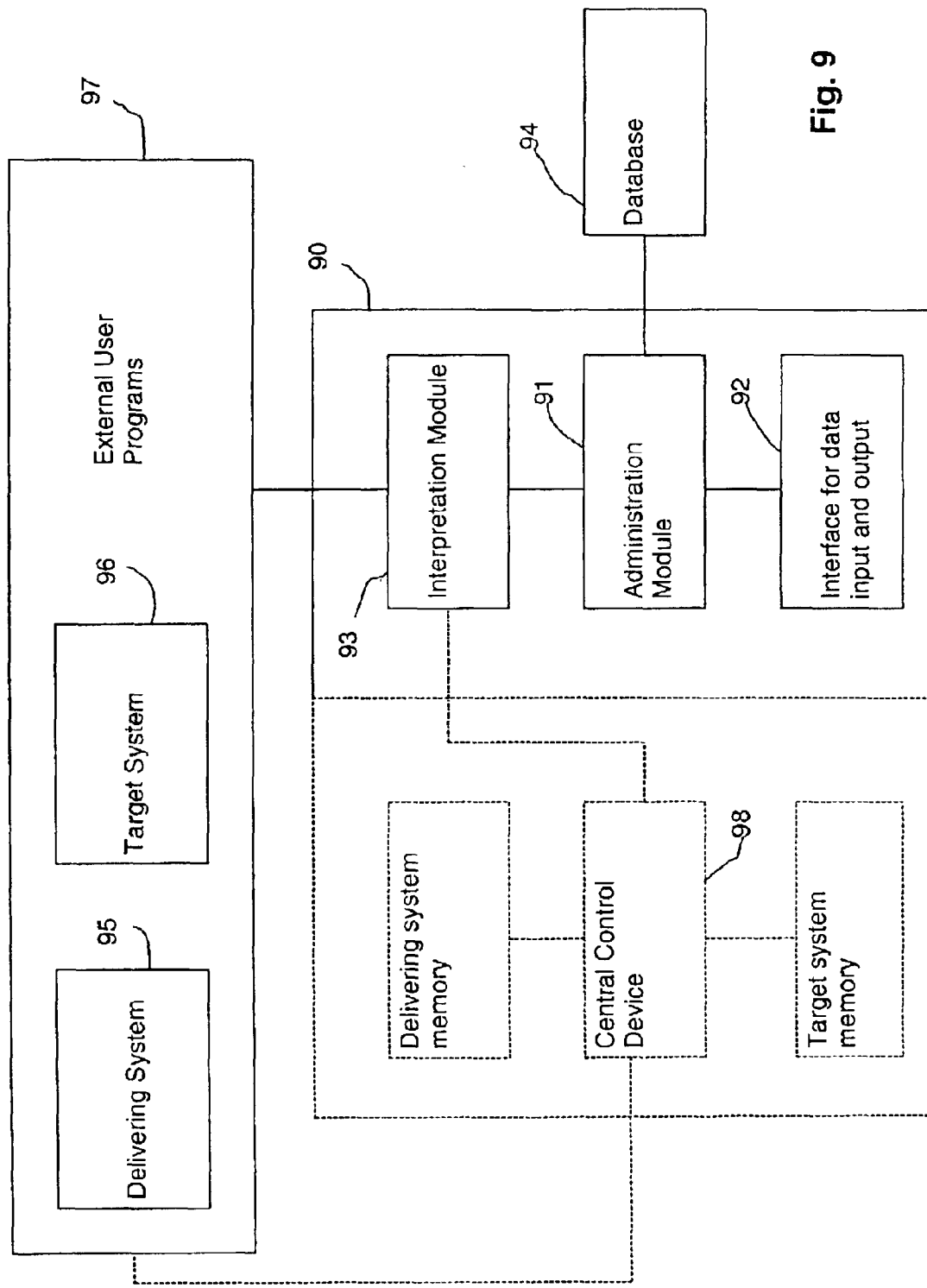
Figure 12:
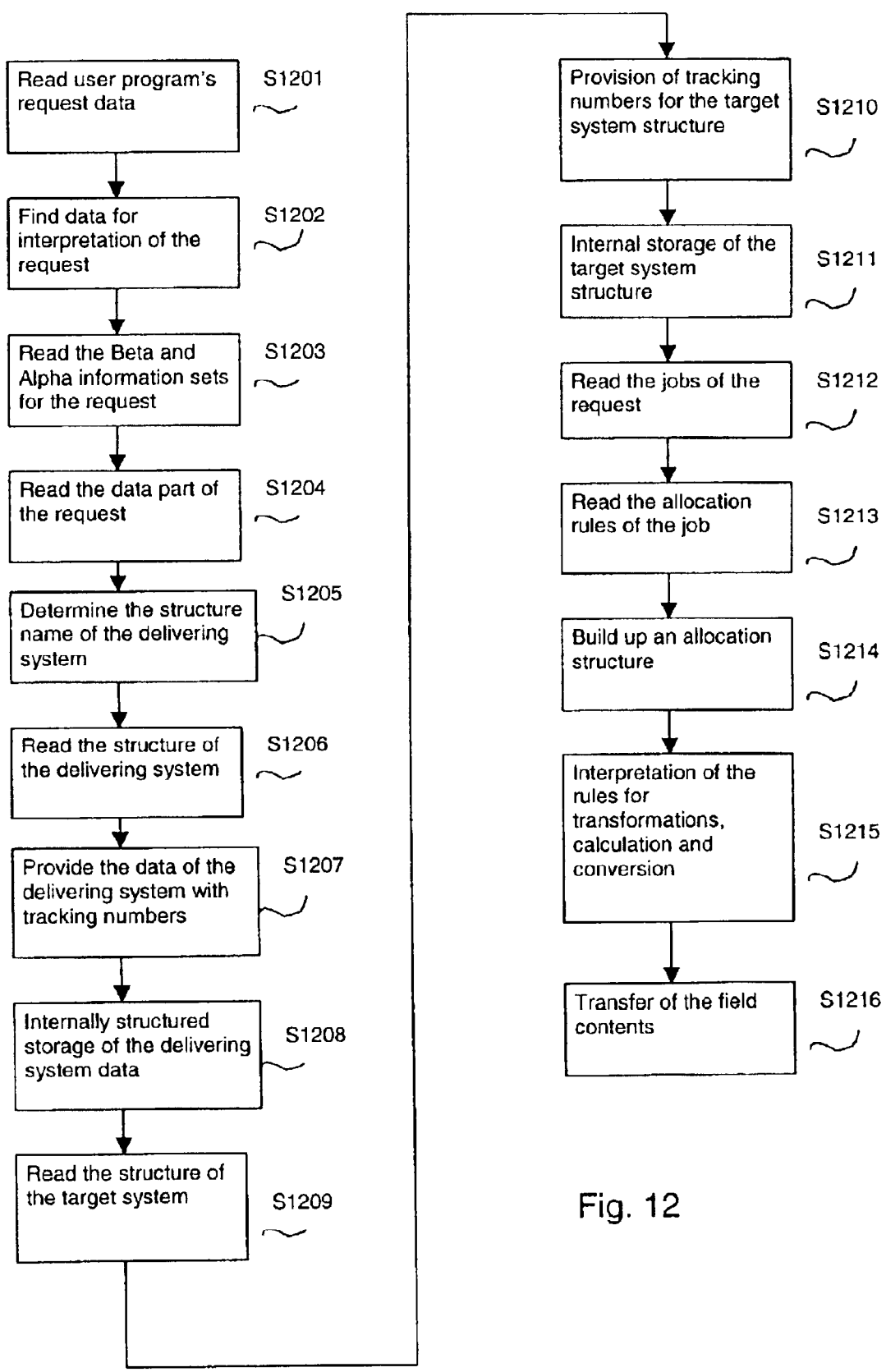
Figure 13:
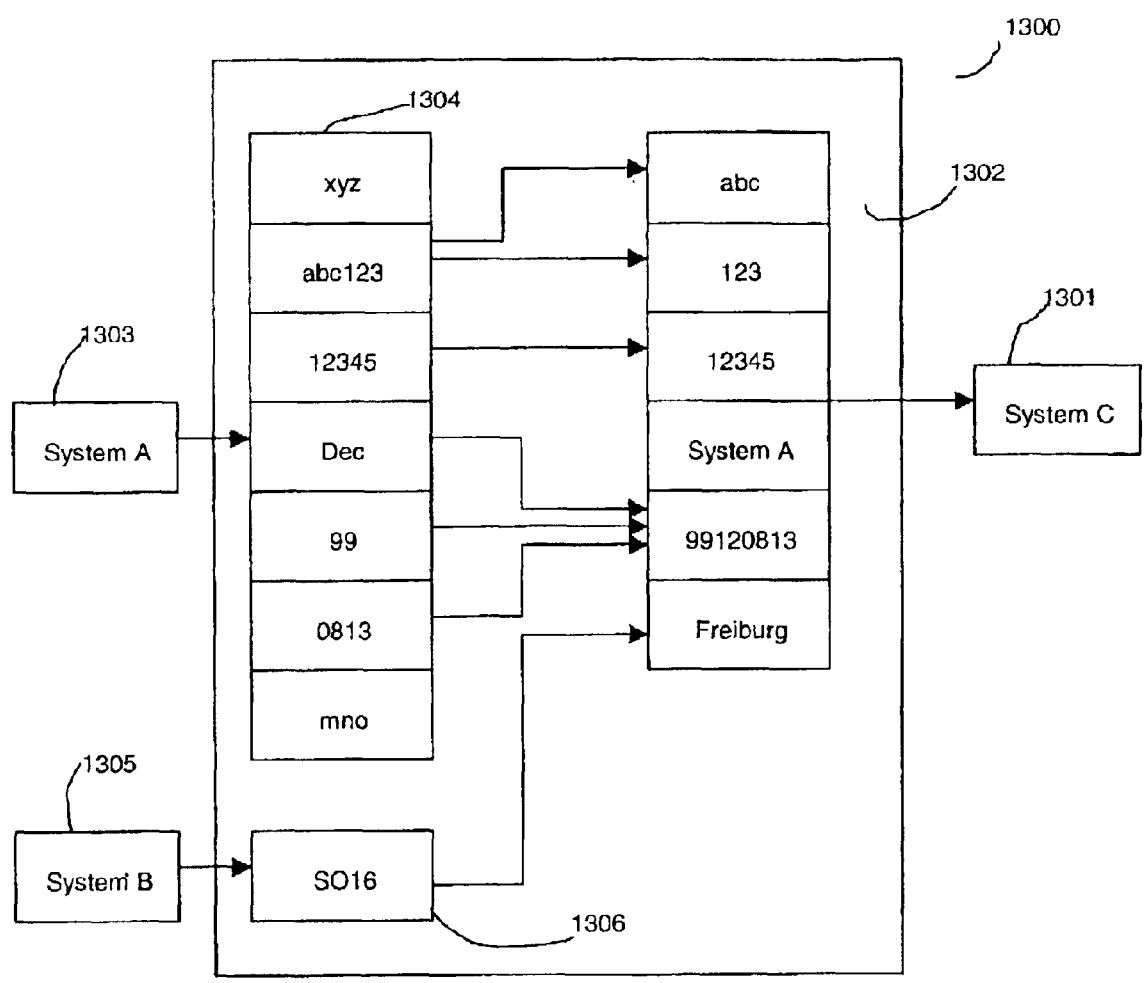

The following description explains in detail the present invention on the basis of exemplary embodiments with reference to the accompanying Figures, in which FIG. 1 shows the relationship in accordance with the invention between the intensional information elements of a hierarchy level and the extensional information elements of the hierarchy level subordinate to this hierarchy level, FIG. 2 shows the structographic construction of the database in accordance with the invention, FIG. 3 shows a simplified, exemplary schematic of a database in accordance with the invention, FIG. 4 shows an input mask for the establishment of a DELTA level, FIG. 5 shows an input mask for the establishment of an ALPHA level, FIG. 6 shows an input mask for the establishment of a BETA level, FIG. 7 shows an input mask for the establishment of a GAMMA level, FIG. 8 shows in a flow diagram the processing logic of the information management program in accordance with the invention, FIG. 9 illustrates a block diagram of the basic components of the information management program in accordance with the invention, FIG. 10 shows the storage of an interpretation structure in the database in accordance with the invention, FIG. 11 shows the storage of allocation rules in the database in accordance with the invention, FIG. 12 shows in a flow diagram the processing components of the interpretation module, and FIG. 13 shows a functional processing schematic of a transformation service of the interpretation module in accordance with the invention.

The data management system in accordance with the present invention is based on a structure of the database in hierarchy levels, whereby each hierarchy level has an information part, the elements of which, the information elements, form a data set. In this context a data set will be understood as a set of data elements of the same or different types which are treated as a unit from logical points of view.

The information elements of a superior hierarchy level have intensional character; in other words they determine the data scheme of the information elements in the next lower hierarchy level associated therewith. Conversely, the information elements of a subordinate hierarchy level function, in accordance with this relationship, as extensional data objects, the structure of which is defined by the associated information elements of the next higher hierarchy level, which information elements are to be understood as meta-data elements.

In the example of FIG. 1, a set 119 of associated information elements$_{sup}$ 111, 112 to 113 of a superior hierarchy level 110 is indicated, wherein each of the information elements$_{sup}$ 111, 112 to 113 contains its own format instruction. Such a format instruction includes typically a plurality of format characteristics such as for example a descriptive element, a field length indication, a field data type etc. Each set of associated information elements$_{sup}$ 111, 112 to 113 thus determines a database scheme.

The information elements$_{sub}$ 130, 140 to 150 of the directly subordinate hierarchy level 120, linked with the information element set 119, form a database instantiation of the database scheme defined by the information element set 119. Each of the information elements$_{sub}$ 130, 140 to 150 is a set of data elements, whereby each of the data elements 131, 132 to 156 represents an instantiation of a format instruction, as is defined in the information elements$_{sup}$ 111, 112 to 113. An information element$_{sub}$ 130, 140 or 150 can thus also be seen as a tupel of a database defined by means of a set 119 of information elements$_{sup}$ 111, 112 to 113. The sequence of the data elements in an information elements$_{sub}$ may thereby deviate from the sequence of the information elements$_{sup}$ 111, 112 to 113 in the set 119. Typically, the sequence of the data elements is determined via special format characteristics within the information elements$_{sup}$ 111, 112 to 113. The sequence of the data elements within the information elements$_{sub}$ 130, 140 to 150 is in contrast identical, whereby however not all data elements need be occupied or, expressed differently, there need not be present for each of the information elements$_{sup}$ 111, 112 to 113 an instantiation in each of the information elements$_{sub}$ 130, 140 to 150.

So that the individual data elements within an information element can be distinguished from one another, a field separator, in the example of FIG. 1 a "|", is placed at the end of each data element. The instantiation of the field separator is, as explained below, selectable. Within an information element it marks the end of a preceding data element and, if present, the beginning of the next data element follows from the field separator.

The organization of the information elements in accordance with a first exemplary embodiment of the present invention illustrated in FIG. 2 gives an overview of the hierarchy levels 21, 22 and 23 and the dependencies between the information elements of these hierarchy levels. The database in accordance with the invention is established in three hierarchy levels 21, 22 and 23. In the highest hierarchy level 21, designated as the ALPHA level in the following, the database schemes for the second hierarchy level 22, designated as the BETA level in the following, are defined. Each information element of the ALPHA level is part of a set 119 of information elements 111, 112 to 113, the ALPHA level in general accommodating a plurality of these sets 119, designated in the Figure as $\alpha_{11}$ to $\alpha_{sk}$. For simplified referencing, in the following an arbitrary set of information elements of the ALPHA level will in general be designated as $\alpha_{xy}$.

For each set $\alpha_{xy}$ there are typically present in the BETA level a plurality of information elements$_{sub}$ 130, 140 to 150 which in turn can be brought together as sets 119 of information elements$_{sup}$ 111, 112 to 113, designated in FIG. 2 as $\beta_{111}$ to $\beta_{srl}$. Analogously to the ALPHA level, in the following an arbitrary set of the information elements of the BETA level will in general be designated as $\beta_{xyz}$. Each set of information elements of the BETA level $\beta_{xyz}$ defines a database scheme for a class of information elements of the third hierarchy level (23), designated as the GAMMA level, $\gamma_{xyzu}$.

Differently from the information element set $\beta_{xyz}$ of the BETA level, the information elements sets $\gamma_{xyzu}$ of the GAMMA level contain no format instructions, but the actual information in a structure as is determined in the corresponding information elements sets of the BETA level and further in the ALPHA level. A grouping of individual information elements of the GAMMA level $\gamma'_{xyzu}$ to information element sets $\gamma_{xyzu}$ is not necessary but can however be employed as a further structural element in the present database.

Optionally, there may be defined, as illustrated in FIG. 2, an ordering level (25) for the formation of the information packets. Differently than in the ALPHA and BETA levels in this ordering level, designated as the DELTA level in the following, no data scheme for subordinate hierarchy levels is determined. Rather, the elements $\delta_x$ of the DELTA level serve for the assembling of the information elements sets of the ALPHA or BETA level into logical units. Therewith there is attained a grouping of information within a common ordering level. An information element $\delta_x$ of the DELTA level thus has no definition-forming character, but a purely designatory and/or descriptive character.

Advantageously, each information element set of the ALPHA level $\alpha_{xy}$ and of the BETA level $\beta_{xyz}$ has one or two information elements having purely descriptive character. Such an element of the set $\alpha_{xy}$ or $\beta_{xyz}$ is no direct component of the defined database scheme, but assumes the role of the designation and/or description of the database scheme. Thus, for this kind of information element in a set $\beta_{xyz}$ there is no correspondence in a definition set $\alpha_{xy}$ of the ALPHA level. However, for the understandability of the data storage and as superior search criteria they make a contribution which is not to be underestimated.

The basis of the database is formed by the definition of the format instructions of the information elements $\alpha_{xy}$ of the ALPHA level or, expressed briefly, the basic fields. The setting of the basic fields is protected, and thus cannot be altered during the operation of the database. With this it is ensured that the database always processes the same logic. At the abstract logical level of the database in accordance with the invention, the basic fields are components of a basic foundation which contains at least indications concerning the name, the data type and the length of a format instruction of the ALPHA level. These three items of information, namely the name of a field, the data type of a field and the length of a field express themselves beyond this through all data structures of all hierarchy levels. All data fields satisfy at least this basic scheme. In the basic foundation there may be defined additional fields. These are likewise established in accordance with the basic scheme. With this one obtains a structure of the basic foundation having a first section for basic elements and a second section for extension elements. In a particular embodiment, the instantiation of the basic fields may be effected and altered by a user or automatically by means of an application.

The instantiations of basic fields indicated in the following table are contained in the basic foundation as a standard:

|  | Field Designation | Data Type | Length | Selection of permitted values | Required Field | Selection alterable |
|---|---|---|---|---|---|---|
| Basic element of the basic foundation | Field Name | Alphanumeric | 50 |  | Yes | No |
|  | Field Length | Numeric | 2 |  | Yes | No |
|  | Field Instantiation | Alphanumeric | 1 |  | Yes | No |
| Extension of the basic foundation | Field Status | Alpha | 1 | S = Key<br>D = Data | No | No |
|  | Status sequence | Numeric | 1 |  | No | No |
|  | Status separator | Alphanumeric | 1 | ~ | No | Yes |
|  | Field separator | Alphanumeric | 1 | \| | No | Yes |
|  | Dynamising field | Alpha | 1 | D = Dynamisable | No | Yes |
|  | Binary storage | Alpha | 1 | O = Folder<br>D = File | No | No |
|  | Instantiation Standard | Alphanumeric | 1 | A = Alpha<br>C = Alphanumeric<br>9 = Numeric<br>X = hexadecimal<br>B = Binary<br>F = Bin-Fixed<br>L = Listbox<br>S = Selection of system-defined criteria | No | Yes |

Attention is direct to the fact that these settings are standard or default settings of exemplary character which can at any time be provided differently or altered corresponding to the above-mentioned particular embodiment in the course of the primary structuring of the database in accordance with the invention. However, these settings are to be understood, for the definition and administration of a database which has already been built, as not further alterable, since they are placed in a protected region of the database. Alteration of the settings in the case of a database which is already been built can be carried out only in the process of a general reorganization to a new build of the database. Extensions of the default settings are, however, also possible with a database which has already been built.

An information element of ALPHA level is a first instantiation of the definitions as they are effected in the basic fields of the basic foundation. There need not be, however, a data element for each basic field of the basic foundation. Basic fields which in the "required field" column have a "no" entry are optional; in case of need they may be employed, but their employment is not mandatory. Basic fields with a remark "yes" in the "required field" column are, on the other hand, obligatory. The anchor information elements of the ALPHA level take up a special position. They represent merely an instantiation of the basic elements name, data type and length.

This basic field "field name" defines an alphanumeric field having a length of 50 characters. A data element in an information element of the ALPHA level, which data element is associated with the definition of this basic field, contains the name of this information element, is a maximum of 50 characters long and employs characters of the alphanumeric data type. "Field length" defines a numeric data type with a maximum of two characters for a data element. This data element in an information element of the ALPHA level serves for indicating the maximum length of an associated data element in the information elements of the BETA level. Since "99" is the largest number that can be represented with two characters, no data element of the BETA level can thus exceed 99 characters. The basic field definition "field instantiation" defines an alphanumeric data field of a length of one character in the information elements of the ALPHA level. A selection of permitted values is not defined with the basic elements of the basic foundation in the example, but is possible.

The three basic field definitions so far mentioned can be designated as basic elements of the basic foundation, since they define the minimum necessary information for the building of a database scheme. They are the prerequisite for the building of a structure in the ALPHA level and lay fixedly defined thereabove. The information elements of the ALPHA level are, however, only a first instantiation of the basic fields.

The first extended basic field definition "field status" opens up the possibility of indicating whether the data element classified thereby belongs the key part or the data part of an information element. The sequence of data elements with the same status definition can be determined with the aid of an indication in the extension basic field "status sequence". The field definition for this provides, in the example of the above table, a numeric field of one character length. The character indicated in the field definition of the extended basic field "status separator" serves for the separation of the key part from the data part in the information elements. Usually, but not necessarily, a key part precedes the data part in the information elements. The status separator "~" indicated in the table can, in accordance with the indication in the column "selection alterable", be replaced by another character at any time. The same applies for the determination of "|" as field separator and the character "D" in the extended basic definition "dynamising field". The classification of an information element as dynamisable, as is effected with a corresponding entry in the dynamising field of an information element of the ALPHA level, means that the corresponding field instantiation in data elements of information elements of the BETA level can be automatically altered by means of an interpretation program, thus are dynamic.

As can be understood from the above table, the employment of a field separator is optional. The employment of a field separator is not necessary for example in the case of an employment of fixed field lengths. Dynamisable fields or fields which do not have fixed length however make the employment of such a separator obligatory. Further, alternatively to the illustration, the system may employ a fixed predetermined field separator as standard, so that the necessity for a corresponding definition in the basic foundation is removed.

In the penultimate extension basic field "binary storage" of the above table there are determined two characters for determining the storage of binary files. The code character "O" indicates that binary files are to be physically stored outside the database, whereas the code character "D" indicates that binary files are to be stored in the data area of the database. In the first case of storage of binary files outside the database, the files are stored in folders and sub-folders the ordered structure of which mirrors the rankings of the hierarchy levels and the key elements. The information management program accesses these files with the aid of the information stored in the information elements of the GAMMA level of the database.

In the last extension basic field "instantiation standard" a selection of permitted values is defined which can be selected in the matching data fields of the ALPHA level and of the BETA level as codes for determining a data type for associated data fields of the respectively subordinate hierarchy level.

In FIG. 3 there is illustrated a simplified, exemplary scheme of information storage in a database in accordance with the invention. For realization of the hierarchy structure, the information storage is effected in a metastructure 24 together with 37 and 38, which is illustrated in FIG. 3 as a table. The metastructure is at the same time an instantiation of a link structure 24 for the connection of information on different hierarchy levels. For each hierarchy level there exists in this metastructure an internal data field which is defined as a fixed field and in the following will be designated as hierarchy field. In the exemplary embodiment having four hierarchy levels on which FIG. 3 is based there are thus four hierarchy fields defined, the field "Delta" 34 for the DELTA level, the field "Alpha" 31 for the alpha level the field "Beta" 32 for the BETA level and the field "Gamma" 33 for the GAMMA level. The sequence of the hierarchy fields indicated in FIG. 3 is sensible for the performance of the- database, but may be modified in correspondence to other needs. The metastructure contains a further internal data field designated by "information" in FIG. 3, for receiving the information elements.

The size and instantiation of the hierarchy fields is defined in accordance with the requirements upon building the database. Size and instantiation are dependent upon the number of sequences to be expected in the database. By sequence, there is to be understood an entry of data in the form of an information element with the associated attributes of the metastructure in the database. In order, for example, to make possible 9,999,999,999 sequences in the database the internal fields can be defined with a length of ten characters with numerical instantiation. In the case of very large data quantities a binary data type suggests itself. In order to alter a definition of the internal data fields in an already existing database, its sequences are exported completely and then, with a modified definition of the data fields, reimported.

The storage logic is put into effect via entries in the hierarchy fields, called attributes in the following. The association of a sequence to a particular hierarchy level is controlled via the presence of attributes in the hierarchy fields. If one determines a ranking between the hierarchy fields such that the highest rank is taken by the field "Delta", followed by the field "Alpha", and therebelow the field "Beta", and the field "Gamma" takes up the lowest rank, the association of a sequence to its hierarchy level can be determined in that the identity of the lowest ranking hierarchy field is determined, which still has an attribute. A sequence of the Gamma level has, if a Delta level exists, consequently an attribute in all four hierarchy fields, whereas in the case of a sequence of the BETA level attributes are present only in the hierarchy fields "Delta", "Alpha", "Beta". Correspondingly in the case of a sequence of the ALPHA level only the "Delta" and "Alpha" fields are filled with an attribute and in the case of sequences of the DELTA level attributes are present only in the "Delta" field.

The linking of information elements of lower hierarchy levels with information elements sets of higher hierarchy levels is controlled via the value of the attributes in the hierarchy fields. Sequences having identical attributes in the same hierarchy fields are associated with one another.

Two arbitrary information elements of the GAMMA level are members of the same group $\gamma_{xyzu}$ within this hierarchy level if their sequences have identical attribute values in the hierarchy fields. The information element with identical value in the field "RNR" and in the hierarchy field "Gamma" is the anchor information element 39 of this group. The further members of this group are derived from this anchor information element.

The data scheme for an information element $\gamma'_{xyzu}$ of the GAMMA level is determined by an information element set $\beta_{xyz}$ the sequences of which have exactly the same attribute value in the hierarchy fields "Beta" and "Alpha". Analogously to this, the data scheme for an information element of the BETA level is located in an information element set $\alpha_{xy}$ the sequences of which have identical values in the hierarchy field "Alpha". In the case of the presence of a DELTA level, in both situations the attribute values in the hierarchy field "Delta" must also agree. All sequences which have the same attribute value in the hierarchy field "Delta" belong to the same logical unit.

In the simplified example of FIG. 3 there is defined a single logical unit, the DELTA element $\delta_{001}$ having the attribute value "001" (in the hierarchy field "Delta"). All further sequences of the database in the example are members of this logical,unit, since they have an identical attribute value in the hierarchy field "Delta".

On the ALPHA level, exactly one information element set $\alpha_{001010}$ is defined with an attribute value "010" in the hierarchy field "Alpha". The associated sequences encompass the running numbers "010" to "017" in the internal data field "RNR" of the metastructure. The attributes in the internal data field "RNR" 35 serve for the unique identification of a sequence or of an information element in the database in accordance with the invention. Size and data type correspond to the same criteria as apply for hierarchy fields. "RNR" is only one example of a field designation and can be freely selected, as can also the names of the hierarchy fields, for each database.

Each information element in the information element set $\alpha_{001010}$ is a data set consisting of data elements the definition of which was effected in the basic fields of the basic foundation. A special position is taken up by the information element with the associated attribute value "010" in the field "RNR", which is solely an instantiation of the basic field "field name" and contains a short description for designation of the information element set $\alpha_{001010}$. It is the anchor information element of this information element set having the attribute value "010" in the hierarchy field "Alpha". This "anchor" forms the basis for the inheritance of the definition of $\alpha_{001010}$ by information elements on the BETA-level which likewise have the attribute value "010" in the hierarchy field "Alpha", but since in itself it represents no definition parameter it is not itself inherited by these. Along with the anchor information element reserved for the short description there can be provided a further element for receiving a long description. This also does not represent a definition parameter and is consequently not inherited by information elements of the BETA-level. Differently from the anchor information element it forms no basis for inheritance. The information elements which are not used for descriptions, called standard information elements in the following, are an instantiation of the data scheme defined in the basic foundation. However, only the core elements of the basic foundation are obligatory. The employment of further basic fields is, in accordance with the layout of the above table, optional.

For simplified representation, in the following an information element with an associated attribute value "xyz" in the internal data field "RNR" will be referred to as information element or data set having the running number xyz.

The data set with the running number 011 contains in the first data element the basic field "field name" with the instantiation "field short designation", separated by the field separator "|", in the second data element the basic field "data length" with the instantiation "25" and further, separated by a field separator, in the third data element the basic field "field instantiation" with the code character "C" as instantiation. The code character "D" in the fourth data element indicates that the associated definition in a data set of the BETA-level is dynamic. Overall, this data set defines exactly one field, or exactly one data element in an associated information element of the BETA-level. An instantiation of this data element contains a short designation of the information element which contains it, having a maximum length of 25 characters of alphanumeric data type. An automatic alteration of the data element format by means of an interpretation program is allowed or, in other words, the data element format is dynamic.

Analogously, the data set having the running number 012 defines a field for the indication of a field length, whereby maximum eight characters of alphanumeric data type are allowed for the indication of a field length (the field length relates to a data element of the GAMMA-level). In this case also a dynamisation of the instantiations of this field definition on the BETA-level is provided.

The further data sets of the information element set $\alpha_{001010}$, which define fields as data elements of the information elements of the BETA-level, determine a dynamisable data element for the definition of a field character of a length of one character, of the alphanumeric type, and also non-dynamisable data elements for the determination of a field status (one character long, data type: selection of system defining criterium), a status sequence (two characters long, data type: numeric), a reference (one character long, data type: list box) and a status separator (one character long, data type: alphanumeric). Reference means that information is referenced, for example from other fields or files. In the indicated example the referenced information is offered in a list box for the selection of a part information item.

The sequences having a running number from "020" to "024" inclusive, define the information element set $\beta_{001010020}$. The information element having the running number "020" is the anchor information element of $\beta_{001010020}$ and contains a short description with the content "Folder". Analogously to the information element sets of the ALPHA-level there can also be provided in the information element sets of the BETA-level an information element for a long description.

Corresponding to the definitions in $\alpha_{001010}$, a data set of $\beta_{001010020}$ consists of data elements which are instantiations of the fields "fields short designation", "length", "field character", "status", "status sequence", "reference" and "status separator". Data elements which have no value for a field in a data set are however omitted. Each data set or each data element of $\beta_{001010020}$ in turn represents a field definition for a data element in a associated information element of the GAMMA-level.

Apart from the descriptive element, the information element set $\beta_{001010020}$ is divided into two part sets. The first part set consists of the sequences having the running numbers "021" to "023" and defines the data scheme of the key part of an associated information element of the GAMMA-level; the second part set having the running numbers "024" and "025" defines the data scheme of the data part of an associated information element of the GAMMA-level.

The data set having the running number "021" contains the instantiations of the field definitions from the information elements having the running number "011", "012", "014" and "015". It defines a field having the description "Folder No." of five characters length with alphanumeric field instantiation, having key status. In the status sequence this field takes up rank 1, i.e. in the key part of an associated information element of the GAMMA-level it stands in first position. The data set with the running number "022" contains a further instantiation of these field definitions. It defines a field with the description "Sub-folder No." of four characters length, of numeric data type, having key status. The status sequence is 2, i.e. in the key part of an associated information element of the GAMMA-level it stands in second place. The data set with the running number "023" is a instantiation of the field definition of the information elements having the running number "011" to "016" in the indicated field sequence. The alphanumeric key field with the status sequence 3 and the length 10 uses a reference connection of the name "Title" in order to select, via a listbox, a journal. Thus, the first part set of $\beta_{001010020}$ contains three sequences for the definition of key elements of associated information elements of the GAMMA-level whereby the instantiations of the first two key elements can be freely input, and the instantiation of the third data element is effected as a selection from a predetermined reference list.

In the second part set of $\beta_{001010020}$ for the definition of the data part of information elements of the GAMMA-level there is defined in the first data set with the running number "024" a data element at the beginning of the data part of an associated information element of the GAMMA-level having the description "Keyword-1", fifteen characters long and of alphanumeric data type, and a reference connection having the name "Article". By means of the reference indication, the instantiation of an associated data element is restricted to values from a reference list "Articles", similarly as above. The second data set having the running number "025" defines, by means of the indication of the status sequence, the second data element in the data part of an associated information of the GAMMA-level. It carries the designation "Documents", has a field length of 12 characters, and is of binary data type.

In the GAMMA-level, the example of FIG. 3 has three sequences with the running numbers "032", "044" and "033". The two first-mentioned sequences have, with "032", an identical attribute value in the field "Gamma" and are therefore grouped within the GAMMA-level. As can be readily seen from the Figure, the information elements of these sequences are built up in accordance with the same scheme. The first data element, which corresponds to the field "Folder No", contains the value "21", analogously thereto the second data element contains as "Sub-folder No" the value "0102". The third data element corresponds to the field "Journals" and receives its value via the reference connection "Title", which is defined in the sequence with the running number "023". The following tilde, the status separator, indicates that with the third element the key part of the information element ends. The structure of the key part assumes the function of a logical ordering of the information structure, which in the case of the employment of a field for the binary storage with the value "0", together with the structure of the hierarchy levels is transformed into an actual storage structure supported by the usual operating systems. The field "Keyword-1" is occupied in both information elements with the value "Shares". This value is selected via the reference connection "Articles". The second data element of this data part corresponds to the field "Documents" and contains in the first information element of the group the value "Shares.doc" and in the second the value "Shares2.doc". The information element having the running number 032 is the anchor information element of this group. The second member of the group having the running number 044 is derived from this. This can also be seen from the temporal referencing of the two sequences in the internal data fields "DATEFROM" 37 and "DATETO" 38, from which it is apparent that the period of validity of the information element with the greater running number directly adjoins on the period of validity of the anchor information element.

The third information element of the GAMMA-level having the associated running number "033" differs in the key part from the first two only through a different value of the selected journal ("DM"). The data part contains exclusively the value ("Real Estate") from the reference connection "Articles". The value for the field "Documents" is left open in the example. The information element thus designates only a logical storage location, but no document.

As already mentioned, the instantiations of the information elements of the BETA-level can be automatically altered by means of an interpretation program, insofar as the field definitions in the associated information element set are characterized as dynamisable. Thus, for example, field lengths, instantiations or also other information can be altered. This occurs through an analysis of the information elements of the GAMMA-level for example upon the inputting of data or in general, when the interpretation program accesses the data,of the GAMMA-level.

In order here to ensure the consistency of the information, a temporal referencing is associated with each information element. This temporal reference dates the validity of an information element. In the embodiment of the database in accordance with the invention as is illustrated schematically simplified in the example of FIG. 3, the metastructure includes two further internal date fields, "DATEFROM" 37 for receiving an initial, and "DATETO" 38 for receiving a final value of the validity. As is the case also with other data fields, the names of these internal data fields for the temporal referencing are freely selectable when building the database.

Similar information items having different temporal referencing indicate different validities. A correct interpretation of the data sets in the information elements is effected via a checking of the validity. In order, for example, to alter the data structure of a data element, initially a new sequence is created as a copy of the original and for this copy a new temporal referencing is determined. In the superior hierarchy level or levels there are now applied information element sets corresponding to the new data structure. These contain in the hierarchy fields the same attributes as were associated with the original sequence, but have as temporal referencing the value of the sequence copy. Finally, the data structure of the information element of the sequence copy is appropriately modified. The indicated sequence is one of many possibilities and can be determined upon building of the database.

Building and administering the data structure of the database in accordance with the invention are effected by means of an information management program the process steps of which will be described in more detail below.

In FIG. 4, the input mask 40 for the optional building of a DELTA-level is illustrated. For a user, the building of a DELTA-level is confined to the definition of a first element $\delta_x$ in this level. $\delta_x$ is built by the input of a description 41 into an input field 42. In FIG. 4, "Administration" is employed as description. In a further embodiment of the present invention there may be additionally input a description of the element. The allocation of an attribute in the field "Delta", in the example of FIG. 3 the value "001", is normally effected automatically.

FIG. 5 shows the input mask for the building of an ALPHA-level provided by the building of a set of sequences for the determination of an information element set $\alpha_{xy}$. In a first input mask 50 the description 52 of the information element set is input. In the example, the description "Clipboard". As previously for the DELTA-level, here also in a further exemplary embodiment of the present invention there may also be indicated additionally a description of the information element set. In a second input mask 51 the individual information elements of $\alpha_{xy}$ are defined in succession. For clarity, in FIG. 4, only the basic fields 53 of the core definitions of the basic foundation are indicated. In the indicated example, the data elements 54 of an information element (each data element corresponds in each case to an instantiation of a basic field definition) are input into input fields 55 below the field description 53. Already defined information elements 56 are indicated therebelow.

The input mask for the BETA-level in turn consists of two part masks, as illustrated in FIG. 6. Analogously to the levels of the superior hierarchy levels there is input into a first part mask 60 a designation 62 of the information element set $\beta_{xyz}$, and, if applicable also a description. The second part mask 61 contains designations 64 of the information elements of the information element set $\alpha_{xy}$ previously selected as template, and in relation thereto input fields 63 for the input of the actual instantiations 65 of these fields for an information element of the BETA-level.

The necessity for a designation or a description is not present on the GAMMA-level, since here the description of the type as effected on the BETA-level is sufficient. The input mask 70 of the GAMMA-level presents, as illustrated in the example of FIG. 7, the designations 71 of the information elements of the information element set $\beta_{xyz}$ previously selected as template with indication of and ordered in accordance with the status 72 of the corresponding field. The input fields 73 for the input of the current instantiation 75 of this field in a current information element of the GAMMA-level are placed in optical relationship to their designations. In the case of a reference field, a listbox 75 assumes the role of an input field.

Advantageously the input masks present further information, such as for example ordering (status sequence 76) or associated (status indication 72) information, but also the designation 77 and/or description of the information elements of superior hierarchy levels selected as templates.

The issue of the attribute values into the hierarchy fields is effected automatically in order to avoid that duplicate values, and thus unclear associations, arise. The issue attribute values can be realized for example by means of a counter, which for each input of an information element set issues an unique value as attribute for the internal data field "RNR". Therewith, each sequence of the database is unique. In the case of anchor information element the attribute value in the field "RNR" is passed into the corresponding hierarchy field.

In the case of building of a new DELTA-element, its anchor information element thus has the same value in the hierarchy field "Delta" as in the internal data field "RNR". An anchor information element of the ALPHA-level has the same values in the fields "Alpha" and "RNR", an anchor information element of the BETA-level has the same values in the fields "Beta" and "RNR" and an anchor information element of the GAMMA-level has the same values in the fields "Gamma" and "RNR".

An overview of an example of processing logic of the information management program in accordance with the present invention is given by the simplified flow diagram 800 of FIG. 8. At the beginning, in step S810 a query is raised whether an element should be created within a predetermined, that is already existing, group. The expression "group" relates in this context to a logical unit such as is provided by a δ-element consisting of one or two information elements on the DELTA level. If the answer is no, in step S820 the creation of a group is suggested and if this suggestion is agreed it is asked in step S830 whether a, or a new, δ-element should be created. In the case of a positive answer, in step S832 the fields for the δ-element (designation, possibly also description) are displayed to be filled in, and in the following step S833 the δ-element is finally taken up, whereby for the case that the first δ-element of the database is involved, at the same time the DELTA level is created. If the query S830 is answered with no, a termination of the input mode is effected in step S831. A negative answer to the query S820 goes directly over to step S811, since the employment of a group for creation of information sets is not positively required. After creation of the δ-element, the processing logic begins again at step S810, whereafter in step S811 fields for the input of a designation and/or description of an information element set of the ALPHA-level are displayed. In step S812 the instantiations of the basic field definitions for this information element set are input in the form of one or more information elements. The thus effected Alpha definitions are taken over by information elements on the BETA-level in step S813.

After a query S840 whether further information is to be created (a no answer leads to the termination S831 of the current input mode), in step S841 an information element set of the ALPHA-level can be selected. In step S842 there are displayed fields for the input of a designation and/or description of an information element set of the BETA-level. In the following step S843 the selected ALPHA definitions are effected and the instantiations of the β-information elements is effected. Finally, the new information element set of the BETA-level is taken over in step S844.

The input of information element into the GAMMA-level begins in step S845 with the selection of a desired BETA definition, that is the field definitions as they are determined in a particular β-information element set. The input of designations and/or descriptions, as in the ALPHA and BETA-levels, is not required, but analogously to further data input in these hierarchy steps the instantiations of one or more 65 -information elements are input in step S846 on the basis of the selected Beta definitions. The taking-up of this data is effected in step S847 and in the last step all generated data is finally stored.

The information management program permits access to all information elements of the BETA-, GAMMA- and DELTA-levels. Through input of a designating and/or descriptive element of the DELTA-level, an information element set of the ALPHA-level, information element set of the BETA-level or of an information element or a part of an information element, all relevant stored information can be found and output.

The block diagram of FIG. 9 shows the basic components of the information management program 90 in accordance with the invention. The task of the administration module 91 is the control of the data storage in a database 94 corresponding to the needs of the database and the making available of an accesses to this database. The making available of masks for the input of data and for the creation of queries is realized via the interface 92 for input/output of data. The interface to user programs which access the data of the database is formed by the interpretation module 93. It makes it possible for database users, such as for example user programs, to access the data without knowledge of structures and field attributes or the systematic organization of the database. The required data is then passed on by the interpretation module 93 either together with the field definitions to the user program or passed on formatted corresponding to requirements of the user program. Vice versa, the interpretation module can apply structure templates, i.e. field definitions, to data directed thereto and can thus itself effect field content allocations and field content transfers, without having to taking into consideration the individual applications.

The basis of this translation of data structures is the storing of an interpretation structure in the database itself. An example of this is given in FIG. 10. The available interpretation structures are assembled under the element "IT" of the DELTA-level. On the ALPHA-level the structure elements necessary for the translation are defined, and the structure definitions are located on the BETA-level.

The translation of the data structures is effected in accordance with allocation rules which in turn are themselves stored in the database. This is possible since the parameters of the rules can be represented as elements of a database. FIG. 11 gives an example for such a storage of allocation rules. As previously the interpretation structure itself, the allocation rules are also assembled under the element "IT" of the DELTA-level. In the ALPHA-level the basic elements necessary for the determination of the rules are defined. The information elements of the BETA-level set the formats for the fields of an allocation rule, and building therefrom each information element of the GAMMA-level contains an allocation rule in the form of a parameter set.

In the example of FIG. 11, the temporal referencing of the information elements is used to restrict the validity of a document type. In information element set "1032" the "reminder" loses is validity on Apr. 1, 2001 and is replaced by the "further reminder" with the beginning of May 1, 2001. Beyond this, there can be employed for example references in an information element of the GAMMA-level in order to determine consequential rules.

The communication between an application program and the interpretation module is built upon the issue of requests to the interpretation module., A request contains at least indications concerning its nature or kind, the source data to be translated, the system from which the source data originates, in other words a designation of the delivering system, and a designation of the target system and an output point for the target information.

The database may here itself accommodate the delivering and/or target system, but also external databases may be considered as delivering and as target systems. Particularly in the latter case, the interpretation module assumes the tasks for example of the translation, conversion and transformation of data and data structures of different origins and other information, so that a user program can exchange data between different data processing devices without knowing their structures.

The processing schematic of the interpretation module is illustrated in the flow diagram of FIG. 12. Initially, the request data of the user program is read in step S1201. The request data contains a key, which indicates the kind or nature of the request, e.g. a transformation service. On the basis of this key the interpretation module seeks the data for interpretation of the request data in the database, in step S1202. In the following step S1203 these information element sets in the BETA- and ALPHA-level belonging to the key are read out and thus finally in step S1204 the data part of the request, which contains the detail indications concerning the request, is interpreted. From these indications the interpretation module determines in step S1205 the structure name of the delivering system and, possibly, the kind of file opening. With the knowledge of the structure name, the read-in of the structure of the delivering system, as is illustrated for example in FIG. 10, can be effected from the database in step S1206. For reliable identification of the data of the delivering system these receive a tracking number in step S1207. The length of the tracking number is read from a length field, i.e. from a data element which is an instantiation of a field for the length indication. In the following step S1208, the data of the delivering system is stored internally corresponding to the structure of the database, whereby suitable information element sets, i.e. information element sets reproducing the structure of the delivering system, are created on the ALPHA-level and on the BETA-level.

Analogously there is now affected the reading-in of the structure of the target system from the database, in step S1209, whereby also here the output data receives a tracking number corresponding to the indications in the length fields in step S1210. The creation of a structure in a database for receiving the output data, that is the data for the target system, in step 1211 likewise contains as in step S1208 the creation of suitable information element sets on the ALPHA-level and on the BETA-level.

In the next step S1212 the requirements of the request are read. The allocation rules (see e.g. FIG. 11) corresponding to these requirements are then read out of the database in step S1213 and in step S1214 stored in an internal structure consisting of information element sets on ALPHA, BETA and GAMMA-levels. In the next step S1215 there is effected the interpretation of the rules for the transformation, calculation or translation on the basis of the field types and finally the transfer of the field contents from the input structure into the output structure in step S1216. Requirements which are not contained within a request are not carried out.

An example of a request of the interpretation module is a transformation service. The transformation service relieves the database systems communicating with one another from the necessity for each partner system to have its own interface. Instead of this, the necessary data is requested via the transformation service of the interpretation module and is received in the system's own structure. The interpretation module assumes responsibility for the information exchange and at the same time the translation of delivered content into target content. This is schematically illustrated in FIG. 13. A target system, system C 1301 requires data from two delivering systems, System A 1303 and System B 1305 via the interpretation module. The structures of the delivering systems 1303 and 1306 and of the target system 1302 are mimicked internally corresponding to the systematics of the database. In accordance with the allocation rules, the field contents of the delivering systems are now transferred into the structure of the target system. Thereby on the one hand the sequence of the fields may be altered, but also the data type of the field may also be altered. Further, not all field contents need to be transferred, and moreover the content of a field of a delivering system may be divided and each part thereof passed to its own field of the target system. Conversely, the content of a plurality of fields of the delivering systems can be combined in one field of the target system. The allocation rules may further also contain instructions for the interpretation of a field content, whereby the result of the interpretation can then be written in a field of the target system.

At this point it is noted that the described transformation is only one selected example for the purpose of illustration of the manner of functioning of the interpretation module. Further application functions are for example, amongst others, the storing and interpretation of data for program control without programming, the storing and interpretation and output of information of all common formats, the storing of tests of external programs, rule-based controls of workflows without programming.

In a preferred exemplary embodiment of the present invention the described services of the interpretation module 93 are provided with the aid of a central control device 98 to a demand oriented interface control system, so that a client-server-client-communication can be realized. The central control device 98 can be realized to be independently runnable, but not functionally independent from the information management program 90 in accordance with the invention. The communication of the central control device 98 with the administration module 91 of the information management program 90 is effected via the interpretation module 93. On the other hand, the information management program 90 can work with the database in accordance with the invention independently of the central control device 98, in the manner of peer-to-peer-communication.

The task of the central control device 98 is the control of requests from delivering systems 95 or target systems 96 to the information management program 90, whereby the processing of a request is undertaken in the above described way by the interpretation module 93. The central control device 98 makes use of the interpretation module 93 and the rule and structure information stored in the database for controlling the requests from the most diverse systems. Via the central control device 98, differing systems 95 and 96, having different requirements and operating with different data formats, can communicate with one another or exchange data, since this device 98 brings about a decoupling of the communication in that it assumes responsibility for matching the requests from the various systems.

On the basis of predetermined rules, held ready in the database, the central control device 98 assumes responsibility, via the interpretation module 93, for the checking of the data of a delivering system for correctness or integrity. Fields for the target system can, in case of need, be filled directly by means of the interpretation module 93 from the central control device 98 on the basis of information of the delivering system. The central control device can moreover also fill fields for the target system without accessing field contents of the delivering system. Examples for this are inter alia the insertion of transformation relevant information such as for example a running number, or the insertion of values which assist in avoiding a "divide by zero" error in the target system.

If a request contains a particular processing dateline, the central control device assumes responsibility for monitoring this dateline and brings about the timely completion of the request. Requests without explicit processing datelines are carried out at the next possible time point. Thus, an acquisition of delivery data can be effected at different times from different, or also from the same, delivering system, just as the passing on of the transformed data to the target system can be effected at a different time point. The communication between the systems can thus be organized independently of the run times of the two systems. If desired, the systems receive return reports concerning the processing condition of the sent requests, which may be useful for example to access processing information of the target system.

A full documentation of all processes is provided by monitoring statistics which are effected in parallel. Each individual part procedure is recorded and is thereby checkable at any time.

The described method allows the creation of a plurality of different data structures in a simple manner on all systems and platforms, without conventional database. The data management system contains in itself the definition of the fields and data structures. Thus, in user programs which access the data of the database these structure definitions can be largely omitted. If, however, a user program needs the structure itself, this can also be requested from the database. The interpretation module offers, with the structure information and allocation rules stored in the database, the possibility for user programs to request data from other database Systems without knowledge of the structure of the systems. The central control device further ensures communication between many different kinds of delivering and receiver media. The database of the database can, in the simplest case be effected as a flat-file database with a metastructure corresponding to a table, the data can however be stored distributed also in a plurality of files.

What is claimed is:

1. Database receiving information in the form of arbitrarily structured data sets in at least one storage device of one or more data processing devices, having hierarchy levels, whereby a superior hierarchy level contains information elements for a definition of the structure of information elements of a subordinate hierarchy level, and a subordinate hierarchy level contains information elements in an instantiation in accordance with a structure which is defined by at least one information element of the superior hierarchy level, a first hierarchy level contains information elements for the definition of the structure of information elements of a second hierarchy level, a second hierarchy level contains information elements for the definition of the structure of information elements of a third hierarchy level, a third hierarchy level contains information elements for receiving information, and a link structure connects the information on different hierarchy levels, characterized in that the link structure contains in a first internal data field a first attribute for the unique association of an information element with an information element or with a set of information elements of the first hierarchy level, in a second internal data field a second attribute for the unique association of an information element with an information element or with a set of information elements of the second hierarchy level, in a third internal data field a third attribute for the unique association of an information element with a set of information elements of the third hierarchy level, and the allocation of an information element to a hierarchy level is determined from the existence of and/or the values of the attributes in the first, second and third internal data fields of the link structure.

2. Database according to claim 1, characterized in that, in a basic foundation a definition of the structure of information elements of the first hierarchy level is effected.

3. Database according to claim 1, characterized by an ordering level for the grouping of elements of the first hierarchy level and/or elements of the second hierarchy level.

4. Database according to claim 3, characterized in that, a fourth internal data field contains a fourth attribute for the unique association of an information element with an information element or with a set of information elements of the ordering level.

5. Database according to claim 3, characterized in that, the allocation of an information element to the ordering level is determined from the existence of and/or the value of the attribute in the fourth internal data field of the link structure.

6. Database according to claim 1, characterized in that, the build-up of the link structure is provided by the combination of the values of the first, second and third attributes, and in the case of the existence of an ordering level, additionally through the value of the fourth attribute.

7. Database according to claim 1, characterized in that, in a fifth internal data field of the link structure, a fifth attribute for a unique identification is associated with each information element.

8. Database according to claim 7, characterized in that, there is provided a sixth internal data field of the link structure for receiving information elements of the hierarchy levels.

9. Database according to claim 1, characterized in that, there is associated with each information element a time value for determining its temporal referencing.

10. Database according to claim 9, characterized in that, the temporal referencing is assembled of an initial value and a final value.

11. Database according to claim 10, characterized in that, the initial value and final value of the temporal referencing are taken into internal data fields of the link structure.

12. Database according to claim 8, characterized in that, an alteration of an information element involves the following steps:
    generation of a new information element as a copy of the information element to be altered,
    alteration of the new information element, and
    allocation of a new temporal referencing to the new information element.

13. Database according to claim 1, characterized in that, the definitions determined in an information element or in a set of information elements of the first hierarchy level form the template for the instantiation of an information element of the second hierarchy level having an identical value of the attribute in the first internal data field of the link structure, and the definitions determined in an information element or in a set of information elements of the second hierarchy level form the template for the instantiation of an information element of the third hierarchy level having an identical value of the attribute in the second internal data field of the link structure.

14. Database according to claim 1, characterized in that, each set of information elements has an anchor information element for which the value of the attribute in its internal data field of the link structure designating its allocation to a hierarchy level is identical with the value of the attribute in the fifth internal data field of the link structure associated therewith.

15. Database according to claim 1, characterized in that, each set of information elements which does not belong to the third hierarchy level has at least one information element having a content descriptive of this set of information elements.

16. Database according to claim 15, characterized in that, one of these information elements having descriptive content is the anchor information element.

17. Method of setting-up and for administering a database in accordance with a database according to claim 1, comprising steps for establishing the hierarchy levels, for establishing information elements within these hierarchy levels, and for the production of links between information elements on different hierarchy levels.

18. Method according to claim 17, characterized in that, a plurality of individual databases are assembled to one logical database.

19. Method according to claim 17, characterized in that, an interpretation of data sets from a delivering system external to the database is effected on the basis of data structure information concerning the delivering system, which information is stored in the form of one or more information elements in the database.

20. Method according to claim 17, characterized in that, a structuring of data sets for output to a target system external to the database is effected on the basis of data structure information concerning the target system, which information is stored in the form of one or more information elements, in the database.

21. Method according claim 17, characterized in that, a transfer of data sets from a first structure to a second structure is effected in accordance with allocation rules which are stored in the database in the form of one or more information elements.

22. Method according to claim 17, characterized in that, a communication of application programs with the database is effected in the form of requests to the database.

23. Method according to claim 22, characterized in that, a request to the database contains at least indications concerning the kind or nature of the request.

24. Method according to claim 22, characterized in that, a control of requests from application programs to the database is effected by means of a central control device.

25. Method according to claim 24, characterized in that, the central control device undertakes a check of the integrity of data from a request on the basis of rules which are stored in the databank of the database in the form of one or more information elements.

26. Method according to claim 24, characterized in that, a request to the database has a processing dateline and the central control device brings about the completion of the request by the processing dateline.

27. Method according to claim 24, characterized in that, the central control device carries out part requests of at least two application programs, the part requests together forming a common request to the database, independently of one another corresponding to the needs of each part request.

28. Method according to claim 24, characterized in that, the central control device informs an application program about the state of processing of a request.

29. Method according to claim 24, characterized in that, the central control device creates additional data on the basis of information in the database.

30. Information management program being executed on one or more data processing devices having means for carrying out a method in accordance with claim 17.

31. Information management program according to claim 30, characterized in that, the information management program and the database administered by the information management program are operated on different data processing devices.

32. Apparatus receiving and administering information in the form of arbitrarily structured data sets having at least one data processing facility, at least one storage device for receiving the data sets, and a device for executing a database management program in accordance with claim 22.

33. Apparatus according to claim 32, characterized in that, at least one data processing facility of the apparatus exchanges data via a network connection.

34. Apparatus according to claim 32, characterized in that, at least one data processing facility of the apparatus is accessible via a public network.

* * * * *